US005508688A

United States Patent [19]

Mochizuki

[11] Patent Number: 5,508,688

[45] Date of Patent: Apr. 16, 1996

[54] SELECTIVE PAGER RECEIVER

[75] Inventor: Yasuyuki Mochizuki, Tokyo, Japan

[73] Assignee: NEC Corporation, Tokyo, Japan

[21] Appl. No.: 272,510

[22] Filed: Jul. 7, 1994

Related U.S. Application Data

[63] Continuation of Ser. No. 836,849, Feb. 19, 1992, abandoned.

[30] Foreign Application Priority Data

Feb. 19, 1991 [JP] Japan .................................... 3-045928

[51] Int. Cl.$^6$ ........................................ H04Q 1/00

[52] U.S. Cl. .................... 340/825.44; 455/343; 455/38.3

[58] Field of Search ...................... 340/825.44; 455/38.3, 455/343

[56] References Cited

U.S. PATENT DOCUMENTS

| | | | |
|---|---|---|---|
| 4,378,551 | 3/1983 | Drapac | 340/311.1 |
| 4,392,135 | 5/1983 | Ohyagi | 340/825.44 |
| 4,755,816 | 7/1988 | DeLuca | 340/825.44 |
| 4,860,005 | 8/1989 | DeLuca et al. | 340/825.44 |
| 4,879,758 | 11/1989 | DeLuca et al. | 455/296 |
| 4,918,438 | 4/1990 | Yamasaki | 340/825.44 |

*Primary Examiner*—Brian Zimmerman
*Attorney, Agent, or Firm*—Sughrue, Mion, Zinn, Macpeak & Seas

[57] ABSTRACT

Even when a user is unaware of a reception informing operation, reception informing functions are automatically stopped to prevent unnecessary current consumption. A receiver includes a mode switch for performing switching between a function for manually stopping the operations of various reception informing functions such as an audible tone, display, vibration, and light emission and a function for automatically stopping them, an auto reset setting switch for performing selection for automatically stopping any of the reception informing functions when the manual stop function is selected, and a timer for automatically stopping the reception informing function selected by the auto reset setting switch when a predetermined duration has elapsed. Even in a manual reset state, the set reception informing function is automatically stopped when a predetermined duration measured by the timer has elapsed.

8 Claims, 8 Drawing Sheets

SELECTIVE PAGER RECEIVER

This is a continuation of application Ser. No. 07/836,849 filed Feb. 19, 1992, now abandoned.

BACKGROUND OF THE INVENTION

The present invention relates to a selective pager receiver and, more particularly, to a selective pager receiver for informing reception by using, e.g., an audible tone, light emission, vibration, and display.

Upon receiving a call, a conventional radio selective pager receiver of this type performs a reception informing function by using, e.g., an audible tone, light emission, vibration, and display. In order to reset these reception informing functions, the receiver has an auto reset function for automatically performing resetting and a manual reset function by which a user performs resetting by depressing a reset button. Although a user can arbitrarily select either of the two reset functions, a selected reset function is unconditionally set up all of the various reception informing functions described above.

FIG. 1 is a block diagram showing a conventional selective pager receiver. Referring to FIG. 1, a radio signal received by an antenna 1 is amplified and demodulated by a radio unit 2. This demodulated signal is shaped by a waveform shaper 3 into a waveform which can be read by a decoder 4. The decoder 4 produces reference clocks by means of a quartz oscillator 5 and compares a receiver call number stored in a memory unit 6 with the signal from the waveform shaper 3 in synchronism with the received signal. If the two numbers coincide with each other as a result of this comparison, the decoder 4 determines that the pager receiver is called and sends a signal to a call informing function control unit 7 and an auto reset timer 8. The auto reset timer 8 is activated by the signal from the decoder 4 and supplies a signal to the control unit 7 if a predetermined duration has elapsed. The timer 8 is activated by a signal from the control unit 7 as well as that from the decoder 4. The call informing function control unit 7 is connected to an auto reset timer 8, a mode switch 9 for performing switching between an auto reset mode and a manual reset mode of call informing functions, a reset switch 10 for manual reset which operates upon depression of a reset button, and a call informing function unit 19. The call informing function unit 19 is constituted by an audible tone amplifier 12, a loudspeaker 13, an LCD driver 14, a display device 15, a vibrator driver 16, a vibrator 17, and an LED 18.

The call informing function control unit 7 receives the signal from the decoder 4 and sends an audible tone signal to the audible tone amplifier 12 to drive the loudspeaker 13. At the same time, the call informing function control unit 7 drives the LCD 15 via the LCD driver 14 to display information indicating that this receiver is called, drives the vibrator 17 via the vibrator driver 16, and causes the LED 18 to emit light, thereby informing a user of the call for his or her receiver. The call informing function control unit 7 may drive some of the informing function set by a switch as not shown as well as all of them.

As shown in a flow chart of FIG. 2, the call informing function control unit 7 checks the state of the mode switch 9 (step S301). When the auto reset mode is set, the call informing function control unit 7 drives the informing function and simultaneously activates the auto reset timer 8. When a predetermined duration has elapsed, the call informing function control unit 7 stops the informing functions in response to a signal from the auto reset timer 8 (step S302). When the reset switch 10 is depressed during execution of the call informing functions, the call informing functions are stopped regardless of whether the manual reset mode or the auto reset mode is set (steps S303 and S304).

The conventional selective pager receiver described above has the following problems. That is, setting of the manual reset and the auto reset of the reception informing function cannot be independently performed for individual reception informing functions. Therefore, when a reception informing function which consumes a large amount of current, such as a vibration reception informing operation using the vibrator or a display reception informing operation using the LCD is performed in case that the manual reset function is set, this informing operation continues until a user depresses the reset switch to stop the informing operation. For this reason, if a user is unaware of the operation of the reception informing function or if he or she is not present near the pager receiver, a current is wastefully consumed to shorten the service life of a battery. In addition, the reset function cannot be selected in accordance with the degree of emergency of a call. Therefore, even in the event of an emergency call, the call is reset when a predetermined duration has elapsed if the auto reset function is set.

SUMMARY OF THE INVENTION

It is an object of the present invention to provide a selective pager receiver which presents unnecessary current consumption upon a reception informing operation even if a user is unaware of the reception informing operation.

It is another object of the present invention to provide a selective pager receiver which prolongs the service life of a battery.

It is still another object of the present invention to provide a selective pager receiver which can reliably call a user in the even of an emergency call.

In order to achieve the above objects of the present invention, there is provided a selective pager receiver comprising a plurality of call informing means for informing a user of a call, detecting means for comparing information included in a received radio signal with a preassigned selective call number of the receiver to detect a call for the receiver, mode switching means for performing switching between a manual reset mode for manually stopping an operation of each of the call informing means and an auto reset mode for automatically stopping the operation, setting means for performing selection for automatically stopping the operation of each call informing means in the manual reset mode, and timer means for automatically stopping any of the call informing means selected by the setting means when a predetermined duration has elapsed from start of calling in the manual mode.

DETAILED DESCRIPTION OF THE PREFERRED EMBODIMENTS

Figure 1:
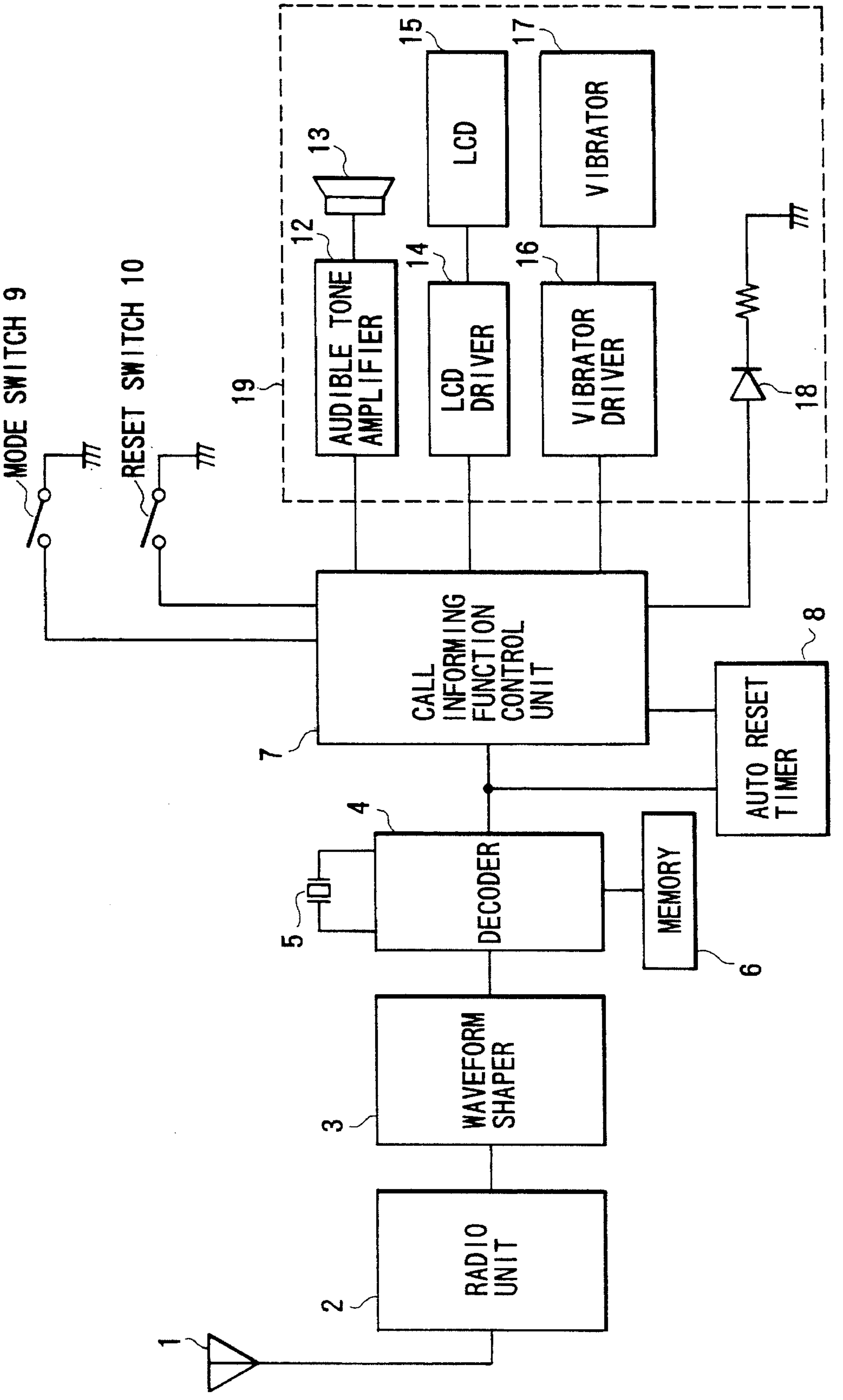
FIG. 1 PRIOR ART
FIG. 1 is a block diagram showing a conventional selective pager receiver.
Figure 2:
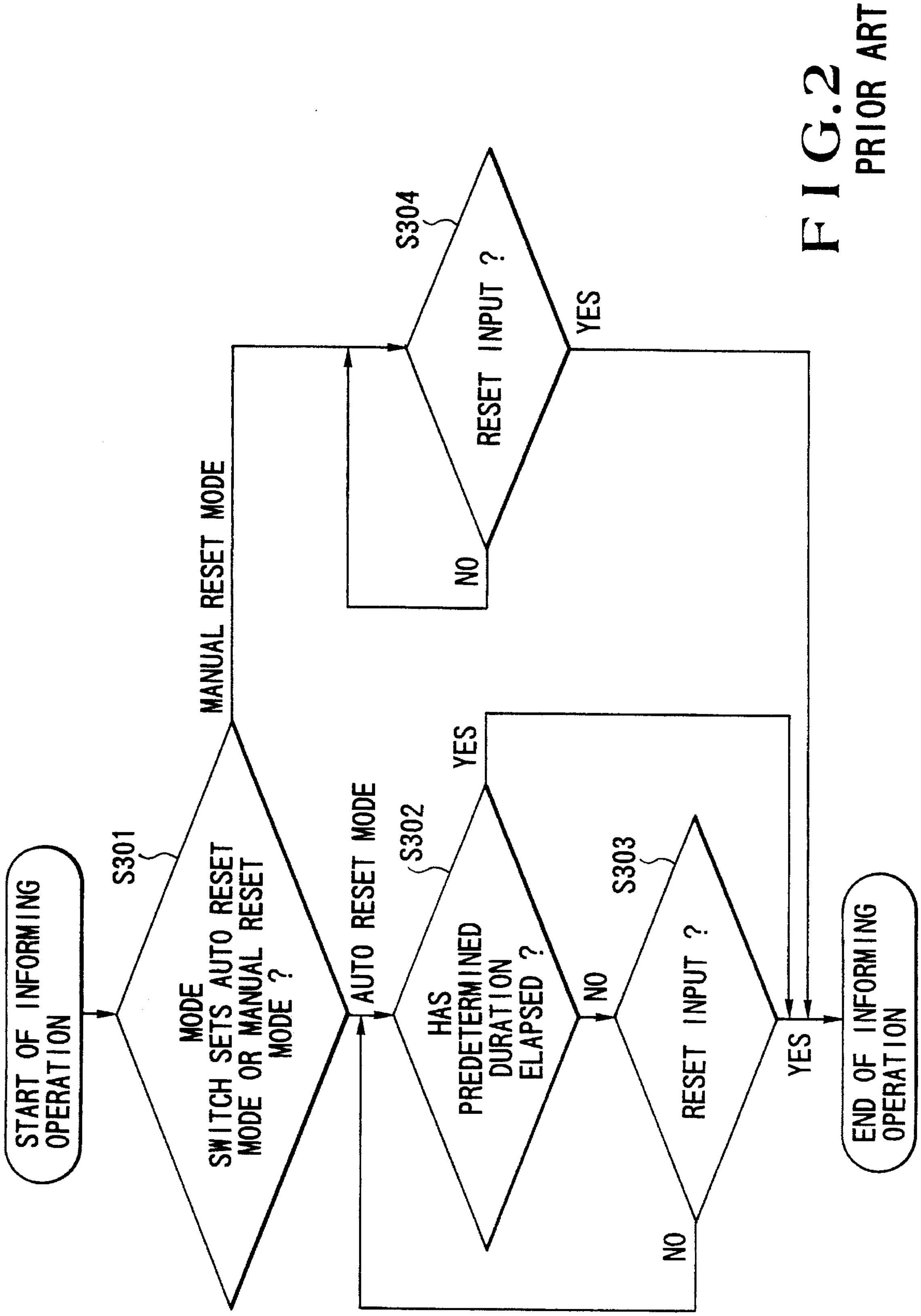
FIG. 2 PRIOR ART
FIG. 2 is a flow chart for explaining the operation of a call informing function control unit shown in FIG. 1.
Figure 3:
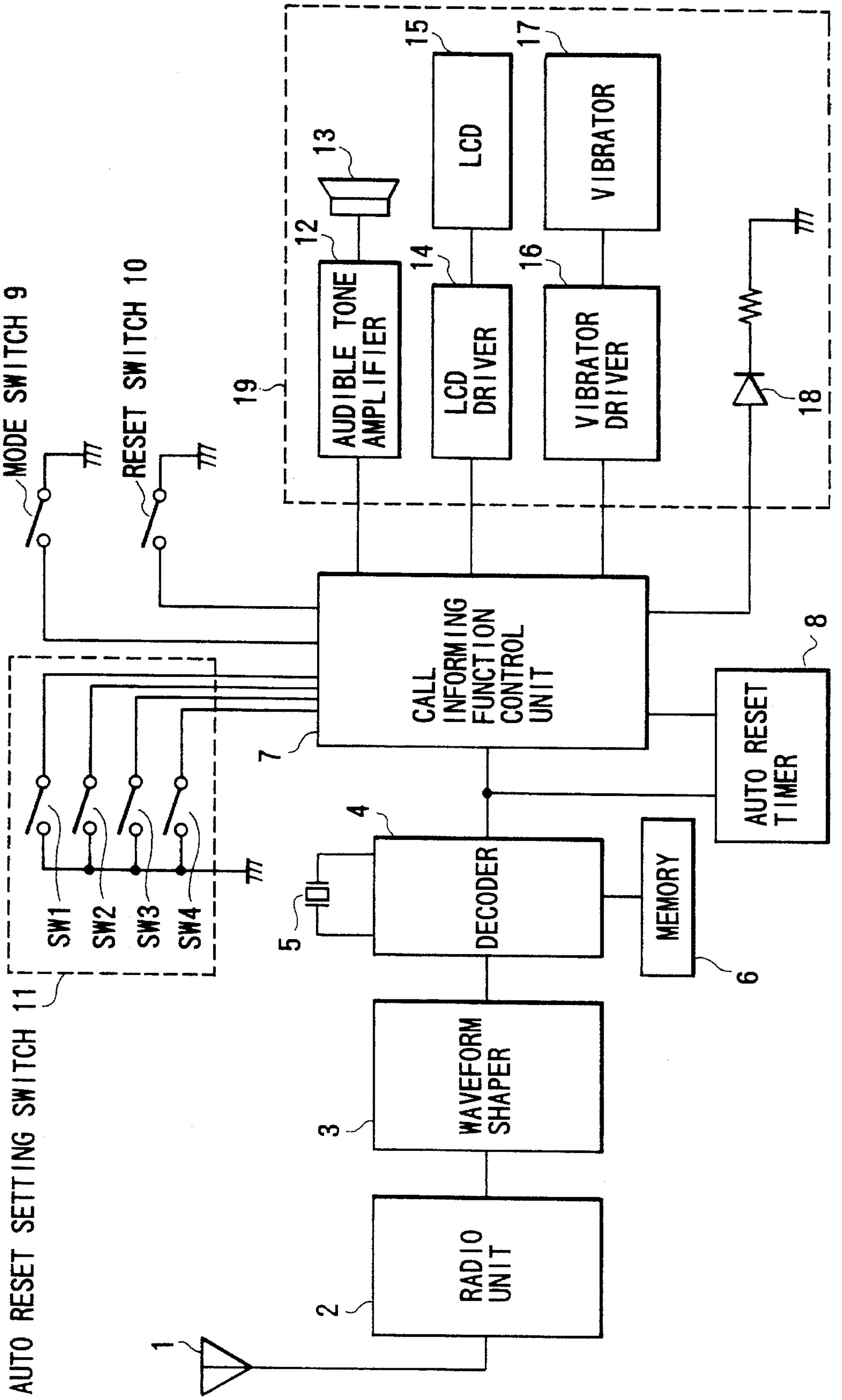
FIG. 3 is a block diagram showing an embodiment of a selective pager receiver of the present invention.

FIG. 3 shows an embodiment of a selective pager receiver of the present invention. Referring to FIG. 3, a radio signal received by an antenna 1 is amplified and demodulated by a radio unit 2. This demodulated signal is shaped by a waveform shaper 3 into a waveform which can be read by a decoder 4. The decoder 4 produces reference clocks by means of a quartz oscillator 5 and compares a receiver call number stored in a memory unit 6 with the signal from the waveform shaper 3. If the two numbers coincide with each other, the decoder 4 determines that the pager receiver is called and sends a signal to a call informing function control unit 7 and an auto reset timer 8. The auto reset timer 8 is activated by the signal from the decoder 4 and supplies a signal to the control unit 7 if a predetermined duration has elapsed. The timer 8 is activated by a signal from the control unit 7 as well as the signal from the decoder 4. The call informing function control unit 7 is connected to an auto reset timer 8, a mode switch 9 for performing switching between an auto reset mode and a manual reset mode of call informing functions, a reset switch 10 for manual reset, an auto reset setting switch 11 for selecting auto reset or manual reset for each informing function when a manual reset mode is set, and a call informing function unit 19 similar to that shown in FIG. 1. The auto reset setting switch 11 is constituted by set switches SW1 to SW4 for an audible tone, display, vibration, and light emission.

The call informing function control unit 7 receives the signal from the decoder 4 and sends an audible tone to an audible amplifier 12 to drive a loudspeaker 13. At the same time, the call informing function control unit 7 drives an LCD 15 via an LCD driver 14 to display information indicating that this receiver is called, drives a vibrator 17 via a vibrator driver 16, and causes an LED 18 to emit light, thereby informing a user of the call for his or her receiver. The call informing function control unit 7 may drive some of the informing function set by a switch as not shown as well as all of them.

Figure 4:
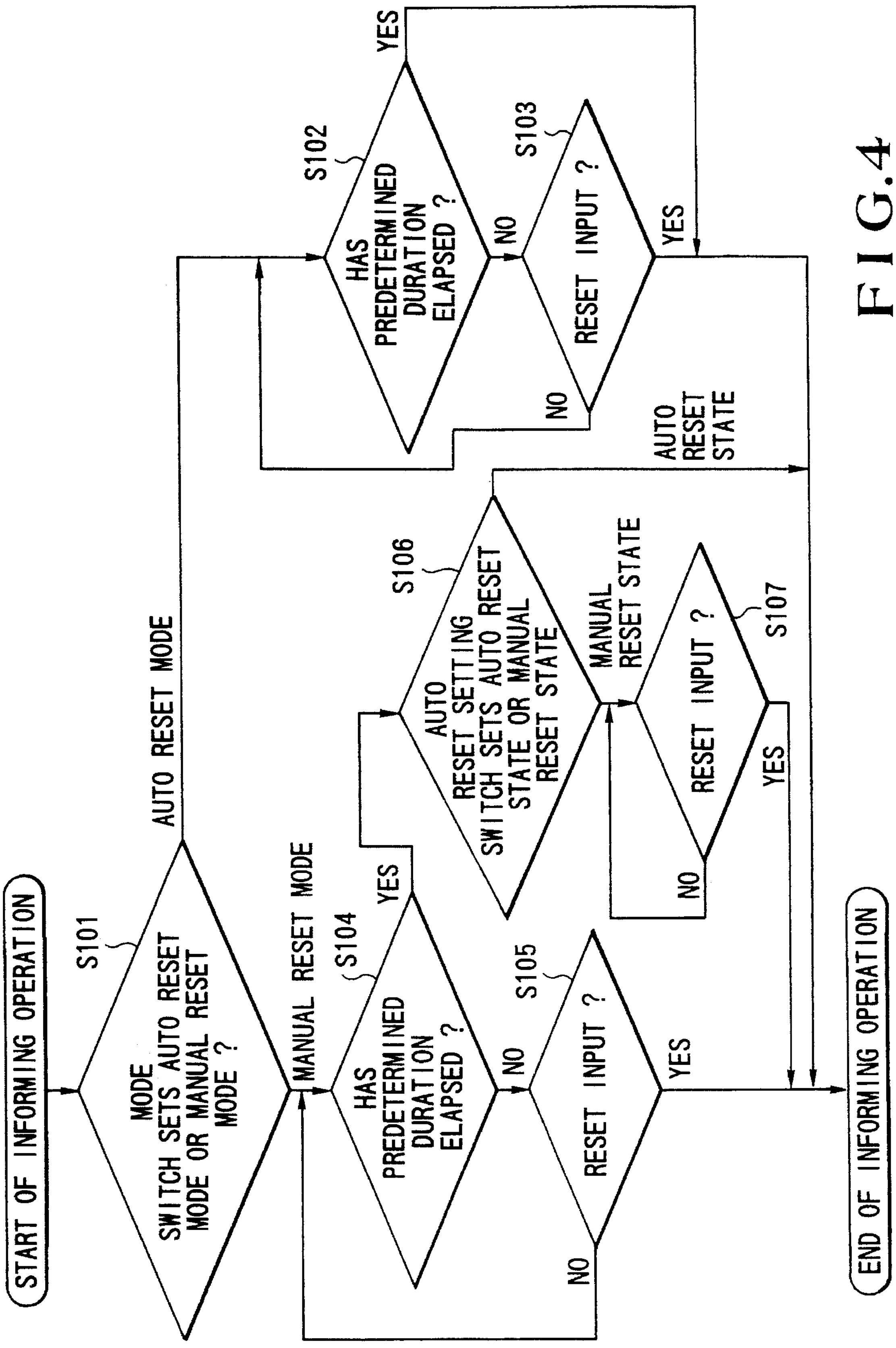
FIG. 4 is a flow chart for explaining the operation of a call informing function control unit shown in FIG. 3.

As shown in a flow chart of FIG. 4, the call informing function control unit 7 checks the state of the mode switch 9 (step S101). If the auto reset mode is set, the call informing function control unit 7 stops all of the informing functions or selected informing functions in response to a signal from the auto reset timer 8 when a predetermined duration has elapsed (step S102). If the manual reset mode is set and the reset switch 10 is turned on during a predetermined period over which no signal comes from the reset timer 8, the call informing function control unit 7 unconditionally stops all of the informing functions (step S105). If a predetermined duration has elapsed with no input from the reset switch 10 (step S104), the call informing function control unit 7 checks the state of the auto reset setting switch 11 for selecting auto reset or manual reset for each informing function (step S106). The call informing function control unit 7 stops the operation of an informing function to be automatically reset and continues the operation of an informing function to be manually reset (steps S106 and S107). When the reset switch 10 is depressed during execution of the call informing functions, all of the call informing functions are stopped regardless of whether the manual reset mode or the auto reset mode is set (steps S103 and S107).

Figure 5:
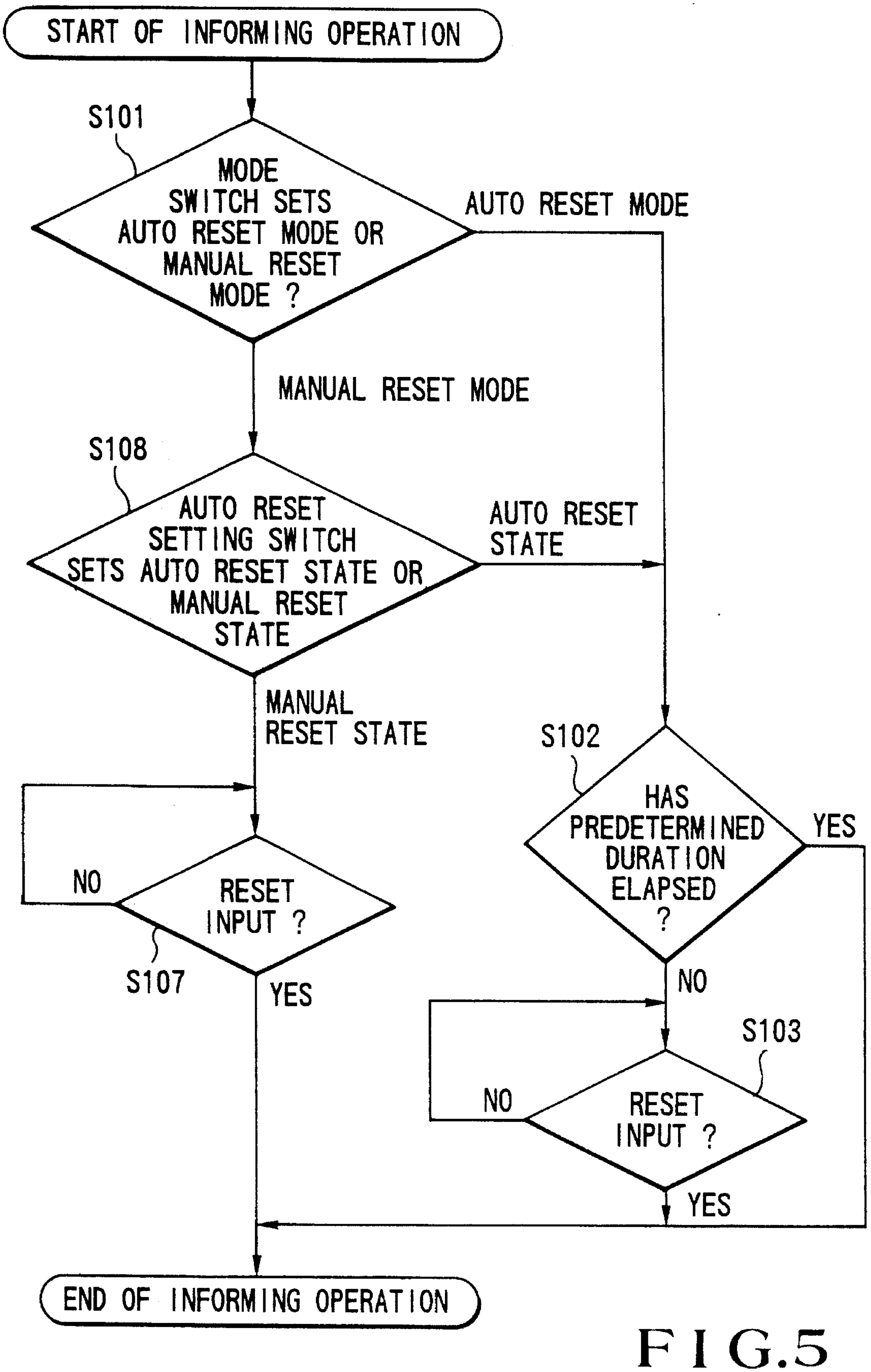
FIG. 5 is another flow chart for explaining the operation of a call informing function control unit in FIG. 3.

FIG. 5 shows another flow chart of operation of the control unit 7 in FIG. 3.

Referring to FIG. 5, if an auto reset mode is set (step S101), the call informing function control unit 7 stops informing functions by using a signal from the auto reset timer 8 when a predetermined duration has elapsed (step S102). If a manual reset mode is set (step S101), the call informing function control unit 7 checks the state of the auto reset setting switch 11 for selecting auto reset or manual reset for each informing function (step S108). If the auto reset state is set (step S108), it decides the predetermined duration elapses or not (Step S102). If the manual reset state is set (step S108), it goes to step S107. When the reset switch 10 is depressed during execution of the call informing functions, all of the call informing functions are stopped regardless of whether the manual reset mode or the auto reset mode is set (steps S103 and S107).

As a result, even if a user is unaware of the operations of the reception informing functions and does not depress the reset button when the reception informing functions are set in the manual reset mode, the operations of reception informing functions which consume a large amount of current, such as the vibrator and the LCD, can be stopped in a predetermined duration by setting the auto reset mode for these functions. Therefore, it is possible to suppress wasteful consumption of a battery due to these reception informing functions and consequently prolong the service life of the battery.

The auto reset setting switch 11 may be constituted by a ROM, and informing means to be automatically reset in the manual reset mode may be predetermined.

In this embodiment, 20 seconds and 8 seconds can be set as the predetermined durations in the auto reset mode.

Note that the reset timer 8 is used in both the auto reset mode and the manual reset mode in the above embodiment, but independent timers may be provided for the respective modes to define different predetermined durations.

Figure 6:
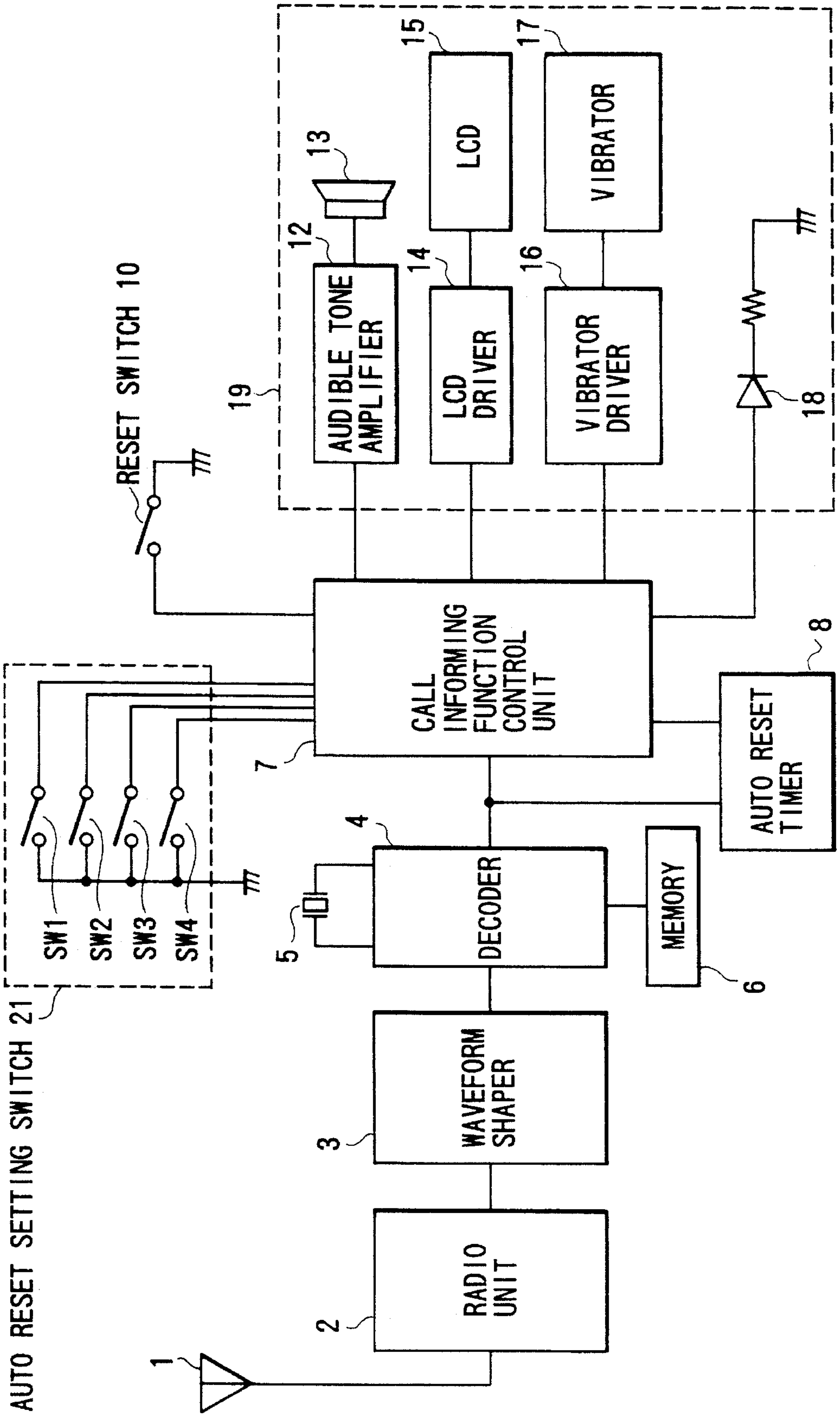
FIG. 6 is a block diagram showing another embodiment of the selective pager receiver of the present invention.
Figure 7:
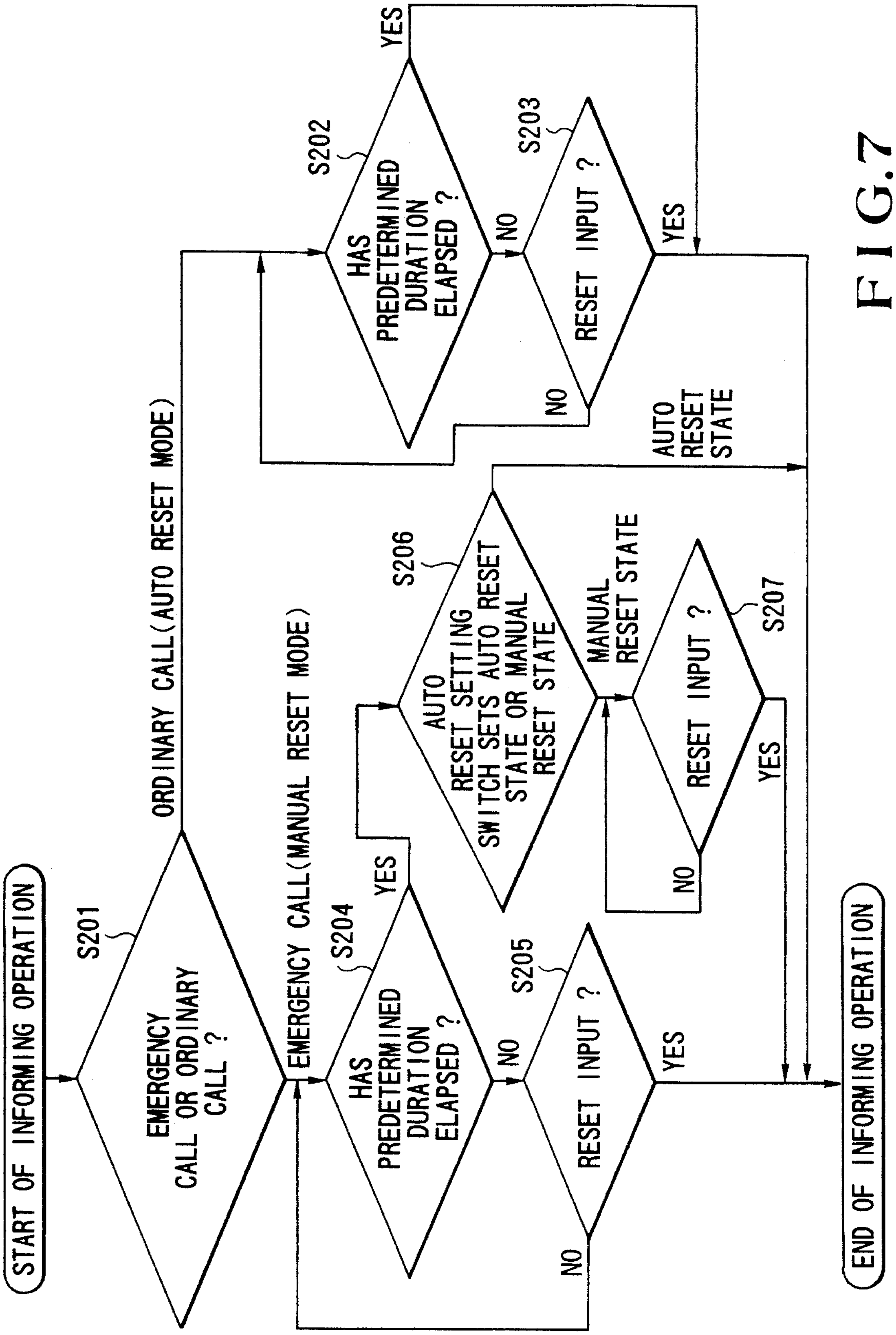
FIG. 7 is a flow chart for explaining the operation of a call informing function control unit shown in FIG. 6.
Figure 8:
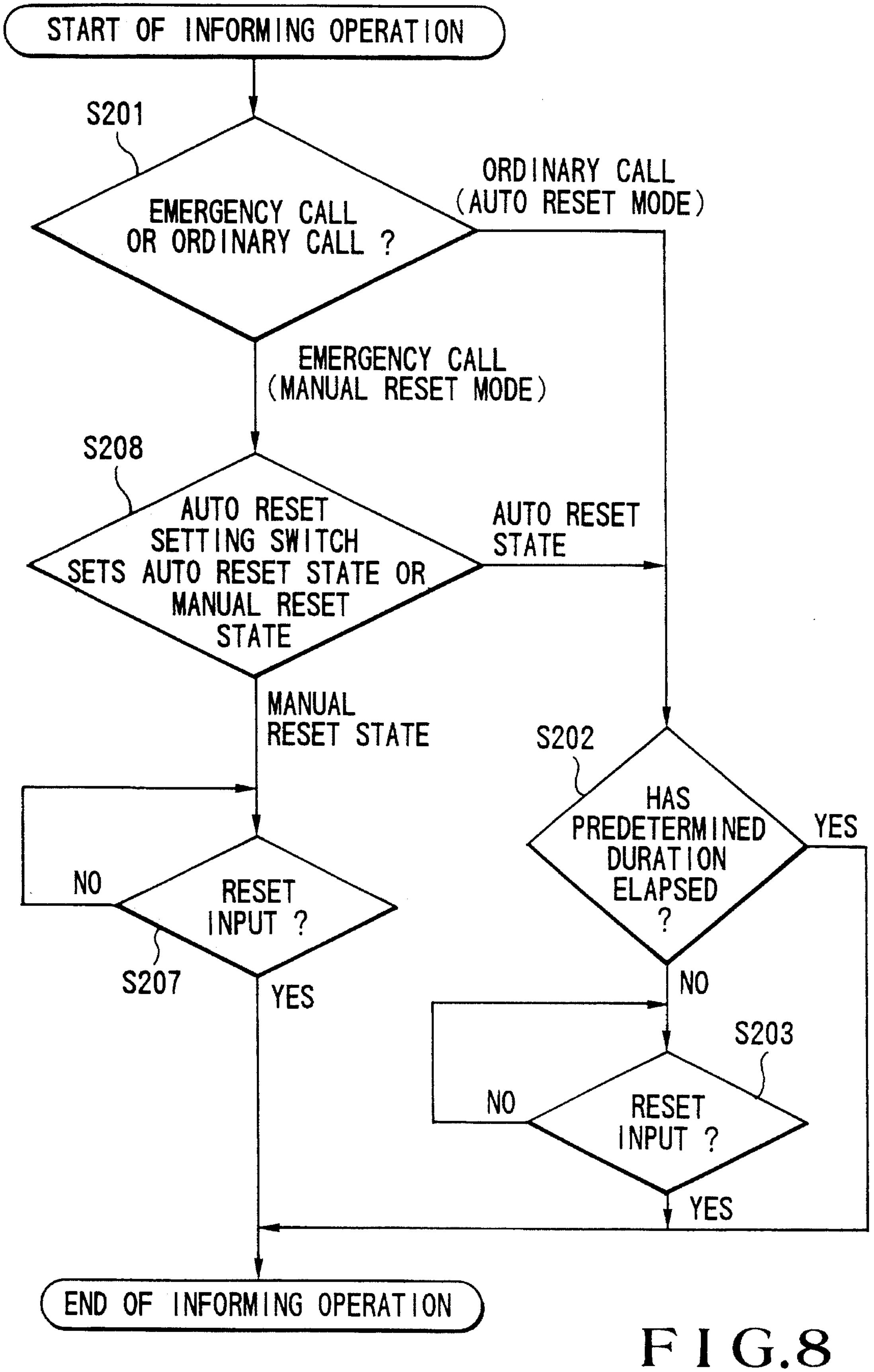
FIG. 8 is another flow chart for explaining the operation of a call informing function control unit shown in FIG. 6.

FIGS. 6 to 8 are a block diagram and flow charts showing another embodiment of the present invention in which an emergency call is set in a manual reset mode and an ordinary call is set in an auto reset mode.

Referring to FIG. 6, a memory unit 6 stores two call numbers respectively for an emergency call and an ordinary call. A decoder 4 compares the call numbers of this receiver with a signal from a waveform shaper 3. If either of the two numbers coincides with the signal, the decoder 4 determines that the receiver is called by an emergency call or an ordinary call and sends a signal to a call informing function control unit 7 and an auto reset timer 8. The call informing function control unit 7 is connected to an auto reset timer 8, a reset switch 10 for manual reset, an emergency call auto reset setting switch 21 for selecting the auto or manual reset mode for each informing function for an emergency call, and a call informing function unit 19.

Referring to FIG. 7, if a call for the receiver is an ordinary call (step S201), the call informing function control unit 7 stops informing functions by using a signal from the auto reset timer 8 when a predetermined duration has elapsed (step S202). If the call is an emergency call, when a predetermined duration has elapsed (step S204), the call informing function control unit 7 checks the state of the emergency auto reset setting switch 21 for selecting the auto or manual reset state for each informing function (step S206). The call informing function control unit 7 stops the operation of an informing function to be automatically reset and continues the operation of an informing function to be manually reset (step S207). When the reset switch 10 is depressed during execution of the call informing functions, all of the call informing functions or selected call informing functions are stopped regardless of whether manual reset mode for an emergency call or auto reset mode for an ordinary call is set or whether a predetermined duration has elapsed (steps S203, S205, and S207).

Referring to another flow char FIG. 8, if a call for the receiver is an ordinary call (step S201), the call informing function control unit 7 stops informing functions by using a signal from the auto reset timer 8 when a predetermined duration has elapsed (step S202). If the call is an emergency call (step S201), the call informing function control unit 7 checks the state of the emergency auto reset setting switch 21 for selecting the auto or manual reset state for each informing function (step S208). If the auto reset state is set (step S208), it goes to step S202. If the manual reset state is set (step S208), it goes to step S207. When the reset switch 10 is depressed during execution of the call informing functions, all of the call informing functions are stopped regardless of whether manual reset mode for an emergency call or auto reset mode for an ordinary call is set or whether a predetermined duration has elapsed (steps S203 and S207).

According to the present invention, as has been described above, even when various reception informing functions are switched to a manual reset state, reception informing functions set by the auto reset setting switch can be automatically reset when a predetermined duration measured by a timer has elapsed. Therefore, even if a user forgets to depress the reset button, the operation of a reception informing function, such as display or vibration, which consumes a large amount of current can be stopped when a predetermined duration has elapsed. As a result, since unnecessary current consumption can be prevented, the service life of a battery can be prolonged. In addition, since manual reset mode is automatically selected in the event of an emergency call, a user can be surely called.

What is claimed is:

1. A selective pager receiver comprising:

a plurality of call informing means for informing a user of a call, said call informing means respectively performing different call informing operations;

detecting means for detecting a call for said selective pager receiver in accordance with information included in a received radio signal and a preassigned selective call number of said selective pager receiver;

mode switching means for switching between a manual reset mode for manually stopping an operation of each of said call informing means and an auto reset mode for automatically stopping the operation of each of said call informing means, operation of each of said call informing means being automatically terminated in the auto reset mode when a first predetermined duration has elapsed after start of calling said selective pager receiver;

setting means for setting selected ones of said call informing means for automatic operation termination in the manual reset mode;

timer means for automatically stopping the operation of any of said call informing means selected by said setting means when a second predetermined period duration has elapsed from start of calling in the manual reset mode; and call informing control means for starting the operation of each of said call informing means and for operating said timer means upon detecting a call for said selective pager receiver in accordance with an output from said detecting means, checking a state of said mode switching means in accordance with an output from said detecting means, checking a state of said mode switching means in accordance with an output from said timer means when said first predetermined duration has elapsed, checking a state of said setting means when said mode switching means is in a manual mode, and for stopping an operation of said call informing means selected by said setting means.

2. A receiver according to claim 1, wherein said setting means comprises a plurality of setting switches provided in a one-to-one correspondence with said plurality of call informing means.

3. A receiver according to claim 1, wherein said call informing means perform call informing operations by using an audible tone, light emission, vibration, and display.

4. A receiver according to claim 1, further comprising an auto reset timer, provided independently of said timer means, for automatically stopping the operation of each of said call informing means when the first predetermined duration has elapsed after start of calling in the auto reset mode wherein the second predetermined duration in the manual reset mode is different from the first predetermined duration in the auto reset mode.

5. A receiver according to claim 1, wherein said timer means is an auto reset timer for automatically stopping each of said call informing means when the first predetermined duration has elapsed after start of calling in the auto reset mode, wherein the first predetermined duration in the auto reset mode and the second predetermined duration in the manual reset mode are the same.

6. A selective pager receiver comprising:

a plurality of call informing means for informing a user of a call, said call informing means respectively performing different call informing information operations;

call informing detecting means for detecting a call for said selective pager receiver and for identifying a type of call in accordance with information included in a received radio signal and respective preassigned selective call numbers for an ordinary call and an emergency call of said selective pager receiver;

mode setting means for automatically setting one of an auto reset mode and a manual reset mode which respectively correspond to said ordinary call and said emergency call detected by said call informing detecting means;

operation setting means for setting selected ones of said call informing means for automatic operation termination in the manual reset mode;

timer means for automatically stopping the operation of any of said call informing means selected by said operation setting means when a predetermined duration has elapsed from start of calling in the manual reset mode; and call informing control means for starting the operation of each of said call informing means and for operating said timer means upon detecting a call for said selective pager receiver in accordance with an output from said detecting means, checking a state of said mode setting means in accordance with an output from said detecting means, checking a state of said mode setting means in accordance with an output from said timer means when said predetermined duration has elapsed, checking a state of said setting means when said mode setting means is in a manual mode, and for stopping an operation of said call informing means selected by said setting means.

7. A receiver according to claim 6, wherein said call informing means perform call informing operations by using an audible tone, light emission, vibration, and display.

8. A receiver according to claims 6, wherein said setting means comprises a plurality of setting switches provided in a one-to-one correspondence with said plurality of call informing means.

* * * * *